United States Patent [19]

Kingsley

[11] Patent Number: 4,688,845

[45] Date of Patent: Aug. 25, 1987

[54] EXTERIOR EXTENSION FOR A TRUCK CAB

[75] Inventor: Richard J. Kingsley, North Bonneville, Wash.

[73] Assignee: Saturn Corporation, Tacoma, Wash.

[21] Appl. No.: 915,093

[22] Filed: Oct. 3, 1986

[51] Int. Cl.⁴ ............................................. B62D 25/06
[52] U.S. Cl. ................................... 296/99 R; 296/26; 296/102
[58] Field of Search .............. 296/99 R, 26, 102, 166; 29/401.1

[56] References Cited

U.S. PATENT DOCUMENTS

| | | | |
|---|---|---|---|
| 3,249,382 | 5/1966 | Swithenbank | 296/26 |
| 3,508,786 | 4/1970 | Colville | 296/26 |
| 3,741,605 | 6/1973 | Lee | 296/99 R |
| 4,202,579 | 5/1980 | Berggren | 296/102 |
| 4,397,497 | 8/1983 | Alonzo, Jr. et al. | 296/26 |

OTHER PUBLICATIONS

Truckin' Magazine, Sep. 1986, pp. 66-67.

*Primary Examiner*—Robert R. Song
*Attorney, Agent, or Firm*—Hughes & Cassidy

[57] ABSTRACT

A rear exterior extension for the cab of a pickup truck. The cab extension is formed by a pair of parallel upstanding side members and a horizontal top cover which is joined to the top ends of the side members. A streamlined appearance is provided by left, right inward extending male mounting portions of the side members which are recessed so that the top cover is fitted about the male portions and aligns with the side members. The side members are mounted to the truck bed rails by mounting brackets which are connected to and enclosed within the side members, and which include vertical fasteners which extend downward through the mounting brackets and top edges of the cargo bed walls.

8 Claims, 3 Drawing Figures

EXTERIOR EXTENSION FOR A TRUCK CAB

TECHNICAL FIELD

The present invention pertains to a rearward exterior extension for the cab of a pickup truck.

BACKGROUND OF THE INVENTION

In the past, pickup trucks typically were used for hauling jobs with little attention being paid to their overall appearance. More recently, with the increased recreational use of these trucks, as well as their everyday use for family transportation, more attention has been given to their overall appearance. Although these trucks are usually not noted for their styling, external trim packages and the like have been made available to satisfy a consumer demand for improvement in the vehicle styling and appearance.

It is important, however, when the styling packages are attached to the vehicle that they give the impression of being professionally installed, i.e. having the appearance of being factory installed, when in fact they are typically installed by the amateur "backyard mechanic". Relatively small changes in the design of these packages can spell the difference between a professional package and an amateur looking add-on.

Conventional rear cab extenders have been disclosed, such as in the September, 1986 issue of *TRUCKIN'* magazine at pages 66-67.

In addition, a cab rear extender is disclosed in Applicant's co-pending U.S. design application entitled "EXTERIOR EXTENSION FOR A TRUCK CAB", filed the same date as the present application.

SUMMARY OF THE INVENTION

The present invention pertains to a rear extender for the cab of a pickup truck. The cab extender includes left and right upward extending side members and a top cover which extends transversely between the top edges of the side members. The bottom edges of the side members are secured to the walls of the truck's rear cargo bed so that the forward edges of the top cover and side members, respectively, are located adjacent to the cab rear window frame.

The upstanding side members are characterized by forward and rearward inward extending edge flanges which mate with forward and rearward downward extending edge flanges of the top cover. To closely and smoothly connect the top cover to the side members, the side members each include an inward extending male mounting portion which engages a complementary shaped female portion of the top cover so that the surfaces of the top cover and side members are aligned.

The bottom of each cab extender side member is mounted to a corresponding cargo bed wall by means of a mounting bracket which includes a horizontal member which is supported on the top edge of the cargo wall, a flange which depends downward from the horizontal member and is supported against the inner surface of the cargo wall, and an upward extending side portion and front and rear end portions which are bonded to the inner surfaces of the cab extender side member. The cab extender is secured to the cargo bed wall by a number of bolts which extend vertically through the bracket horizontal member and cargo wall top edge.

A display light assembly is mounted to the rear end flange of the top cover and includes a brake light portion, a backup light portion and a cargo bed illumination light portion.

It is therefore an object of the present invention to provide a rear extension for the cab of a pickup truck which provides a closely fitting, streamlined, professional appearance to the truck.

BRIEF DESCRIPTION OF THE DRAWINGS

These and other objects and advantages of the present invention will become more readily apparent upon reading the following Detailed Description and upon reference to the attached Drawings, in which.

Figure 1:
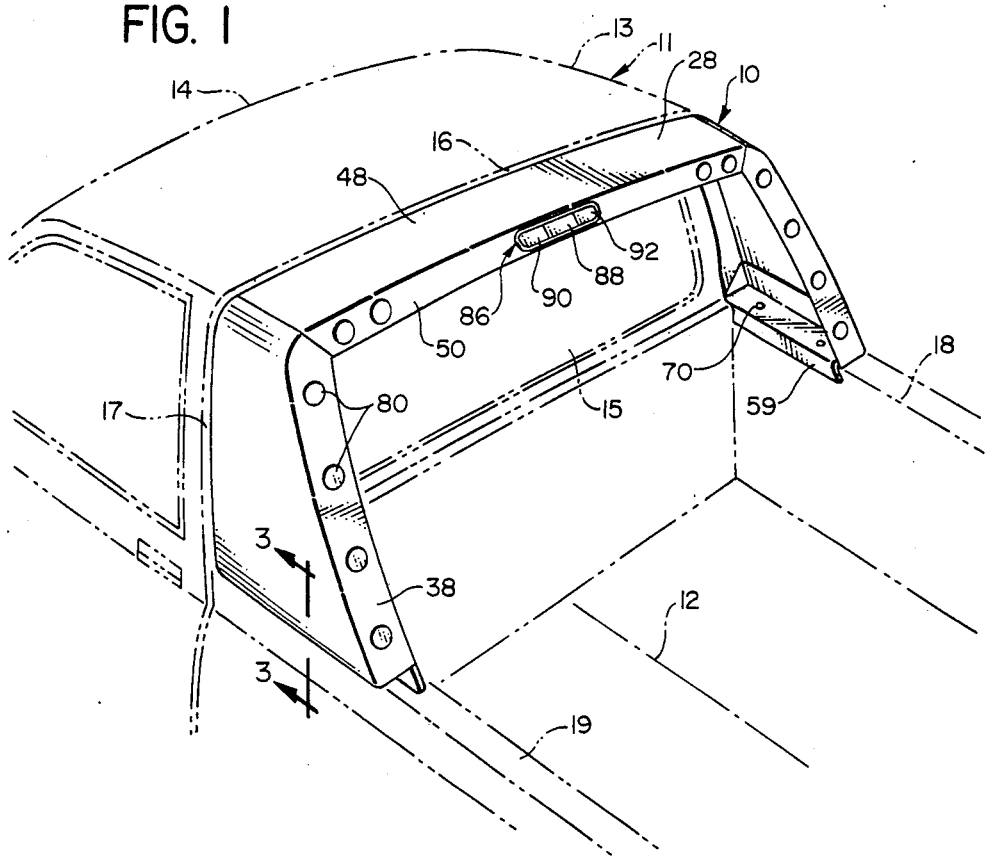
FIG. 1 is an isometric view of the cab extender of the present invention as well as a portion of a pickup truck cab and cargo bed walls to which the cab extender is attached.

While the present invention is susceptible of various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION

Figure 3:
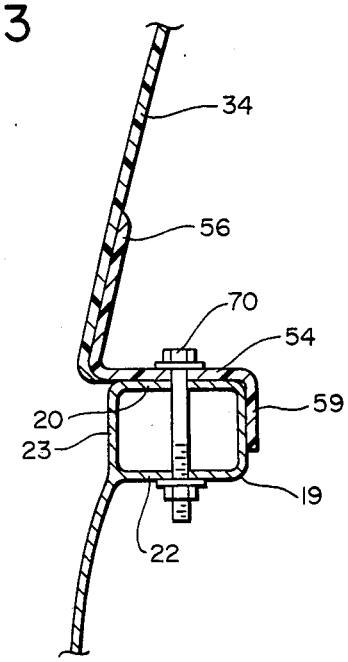
FIG. 3 is a side sectional view taken along line 3—3 of FIG. 1 and showing the connection of the cab extender to the cargo bed wall.

The present invention pertains to a rear extension which is mounted externally to the cab of a pickup truck. Referring to FIG. 1, there is shown the cab extension indicated at 10 mounted to a conventional pickup truck indicated at 11 and having a lengthwise axis designated by the number 12. The pickup truck includes a cab 13 having a forward end 14 and a rear window 15 which is mounted in an external frame having an upper transverse extending edge portion 16 and a pair of vertical side edge portions 17. Extending rearward from the cab is a cargo bed having a forward transverse upstanding wall and a pair of rearward extending left, right walls 18. As shown more clearly in FIG. 3, the top edges 19 of the cargo bed walls 18 have a conventional rectangular cross sectional configuration which is formed by a top horizontal flange 20, bottom horizontal flange 22, and two vertical side flanges 23.

Figure 2:
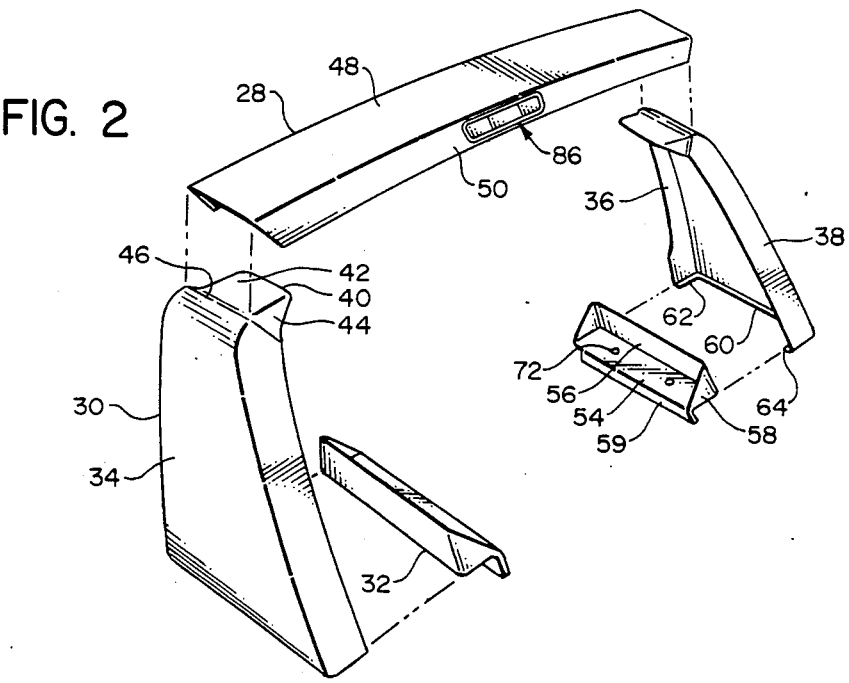
FIG. 2 is a rear isometric exploded view of the cab extender.

In the present invention, the cab extension 10 is made from a plastic material such as acrylonitrile-butadiene-styrene copolymer (ABS), and is fabricated into five sections as shown more clearly in FIG. 2. These sections include a top transverse cover 28, left and right vertical side members 30, and left and right mounting brackets 32; the opposite ends of the top cover 28 being fastened to the upper ends of the side members 30 to form a somewhat inverted U-shaped configuration. More particularly, each side member 30 is formed by a main side wall 34 and forward and rearward inward extending vertical edge flanges 36, 38, respectively, which are integrally attached to the forward and rear edges of the main sidewall 34. While the forward edge flange 36 extends upward in a manner generally parallel to a vertical axis, the rearward flange 38 extends upward and forward to provide a tapered appearance to the side member 30 wherein the top is narrower than the base.

In order to mount the top cover 28 to the side members 30, and to provide a smooth fitting, streamlined appearance, each side member includes an upper inward extending male mounting portion 40 (FIG. 2) which is formed by a horizontal top surface 42 which extends inward from the top end of sidewall 34, as well as forward and rearward side surfaces 44 which extend downward from top surface 42 and which are integrally connected with and are generally parallel to the forward and rearward end flanges 36, 38, respectively. A streamlined fit is provided by recessing forward side surface 44 rearward of forward end flange 36, and recessing rearward side surface 44 forward of rear end flange 38, as well as by recessing top surface 42 below the top edge 46 of main sidewall 34.

In turn, top cover 28 includes a main horizontal transverse extending top surface 48, and downward depending forward and rearward transverse flanged portions 50, which form a female receptacle for the male mounting portion 40. More specifically, top member 28 is positioned on mounting portion 40 so that the inner surfaces of forward and rearward end flanges 50 engage the outer surfaces of forward and rearward sides 44, and the bottom surface of top member 28 engages the male portion top surface 42, in a close fit. Top surface 42 and sides 44 of mounting portion 40 are recessed in a manner that the outer surfaces of the forward and rearward end flanges 50 vertically align with the outer surfaces of the forward and rearward end flanges 36, 38, respectively, and the top surface of top cover 28 is horizontally aligned with the top edge 46. To secure the top cover 28 to the side members 30, fasteners (not shown), such as pop rivets, extend through the cover top portion 28 and the male mounting portion 40.

In order to mount the extender 10 to the cab, the mounting brackets 32 are attached to the bottom ends of the side members 30. More specifically, each mounting bracket 32 includes (i) a lengthwise horizontal floor 54, (ii) a sidewall 56 which extends upward from the outer edge of floor 54, and (iii) transverse forward and rearward endwalls 58 which extend upward from floor 54 and which are connected to the the opposite ends of sidewall 56. Depending downward from the inner edge of floor 54 is a lower flange 59 which extends between the front edge and rear edge of the bracket floor. Having this configuration, the mounting bracket 32 closely fits within the side member 30 so that the outer surface of sidewall 56 is engaged to the inner surface of main sidewall 34, the forward surface of the forward endwall 58 is engaged to the rear surface of the forward end flange 36, and the rear surface of the rear endwall 58 is engaged to the forward surface of rear end flange 38. To secure the mounting bracket 32 to the sidewall 30 and to provide a smooth streamlined appearance, the aforementioned engaging surfaces are fastened to each other other by glue, epoxy or the like.

To further support the mounting bracket 32, sidewall 34 includes an inward extending lip 60 along its bottom edge, and which is joined with a rearward extending lip 62 which is attached to the bottcm edge of forward end flange 36, and with a forward extending lip 64 which is integrally connected to the bottom edge of rear end flange 38.

The cab extension 10 (FIG. 1) is mounted to the truck by placing the forward end flanges 36 and end flange 50 of the cab extension flush against the top portion 16 and side portions 17 of the cab rear window frame. Furthermore, the bottom surfaces of mounting bracket floors 54 are supported on the top flanges 20 of the cargo bed left and right walls. A snug fit is provided by the mounting bracket lower side flangges 59, whereby the outer surfaces of the side flanges 59 engage the inner surfaces of the vertical flanges 23 of the cargo bed as shown more clearly in FIG. 3. The cab extender is secured to the truck by means of a pair of vertically extending bolts 70 which extend through preformed holes 72 (FIG. 2) in the mounting bracket floor 54 and through the cargo bed top flange 20 and bottom flange 22, and which are secured thereto by threaded end nuts or the like.

In carrying out the present invention, the top surface 48 of top cover 28 (FIG. 1) is horizontally aligned and flushly mounted with the top of cab 13, and the outer surfaces of sidewalls 34 are vertically aligned and flushly mounted with the sides of cab 13. The cab extension 10 gives the appearance of a one-piece member which is integrally a part of the cab 13, and which gives a streamlined professional appearance with the mounting bolts 70 being hidden behind the sidewalls 34 and rear end flanges 38.

To provide for additional security when mounting the cab extender to the cab, conventional fasteners (not shown) may be used to connect the forward end flanges 36 of the side members 30 and the forward end flange 50 of the top cover 28, to the window frame.

It should be appreciated that several advantages, in addition to the aforementioned cosmetic features, are provided by the cab extender of the present invention. For one, the cab extender shades the occupants of the cab from the sun. In automobiles, this shade is provided by a rearward extension of the roof rearward beyond the passengers. However, in a truck to increase the capacity of the cargo bed, the windows are mounted in a vertical manner behind the passengers. Thus, the cab extender of the present invention provides a rearward extension of the roof to provide additional sun screening.

In addition, a number of these trucks which are used for off road recreational activities have a U-shaped roll bar which includes a pair of vertical poles extending upward from the floor of the cargo bed adjacent to the rear window frame of the cab, and which join with a transverse member which extends laterally just below the top of the cab roof. In the event the truck is accidentally rolled, the roll bar supports the weight of the truck when inverted, and prevents the cab from being crushed. These roll bars, while providing an important safety function, are somewhat unsightly and detract from the overall appearance of the truck. The cab extender of the present invention encloses the roll bar behind the sidewalls 34, rear end flanges 38 and top rear flange 50.

A further advantage of the cab extender of the present invention is the mounting of reflector or electric lights 80 (FIG. 1) on the rear surfaces of the rear end flanges 38, 50 as shown in FIG. 1. These lights provide additional warning of the presence of the vehicle.

In an exemplary embodiment of the present invention, there is shown in FIG. 1 a status light indicated at 86 which is mounted to top cover rear flange 50 approximately midway between side members 30. The status light includes a red central brake light portion 88, a white cargo light portion 90 which is mounted to the left of and adjacent to the brake light 88, and a backup light portion 92 which is mounted to the right of and adjacent to the brake light 88. The brake light 88 is wired to the truck brake lights, while the backup light 92 is wired to the truck backup lights, and the cargo light 90 is wired to the vehicle parking lights. The status light assembly 86 is mounted within an opening in rear end flange 50 so that the surfaces of the lights are flush with the rear surface of the end flange.

What is claimed is:

1. In a pickup truck having a lengthwise axis and a transverse axis, and having a cab with a rear window supported in a frame and having a cargo bed which has a pair of lengthwise upstanding walls which terminate in respective top edges, a cab extender comprising:
   a. first and second upward extending side members, each of which includes a main vertical sidewall portion and front and rear transverse inward extending end flanges;
   b. a top cover which extends between the upper ends of said first and second side members; and
   c. means for mounting said first and second side members to the truck in a manner that said main sidewalls each have a substantial alignment component which is parallel to the lengthwise axis, and the top cover has a substantial alignment component which is parallel to the transverse axis, and the side members and top cover at their forward ends are adjacent to the rear window frame, said mounting means including first and second mounting brackets which are connected to the lower ends of said first and second side members, respectively, and each of which includes a horizontal member which extends between said front and rear end flanges of said side member, and which is supported on the top edge of the cargo bed wall, a second vertical member which extends downward from said horizontal member between said front and rear end flanges and engages the inner surface of said cargo wall, and fastening means which are positioned inward of said main sidewall and between said front and rear end flanges and extend through said horizontal member, for connecting said horizontal member to the cargo wall top edge.

2. The cab extender as set forth in claim 1 wherein:
   a. said top cover includes the main horizontal portion and forward and rearward transverse end portions which depend downward from forward and rearward transverse extending edges of said main horizontal portion; and
   b. each of said upstanding side members include an inward extending male mounting portion which includes (i) forward and rearward end surfaces which are integrally connected to said forward and rearward side member end flanges, respectively, the forward end surface being recessed rearward from the forward end flange, and the rearward end surface being recessed forward of the rearward end flange, and (ii) a top horizontal mounting surface which is integrally connected to a top end of said sidewall and which is recessed below said top end, said end surfaces and said top mounting surface of said male portion mating within a female complementary shaped portion of said top cover which is formed by said horizontal portion and said forward and rearward end portions, and said top mounting surface and said end surfaces of said male mounting portion being recessed in a manner that said top portion and said end portions of said top cover are aligned with said top end and said side end flanges, respectively, of said side member.

3. The cab extender as set forth in claim 2 wherein each of said mounting brackets include (i) front and rear end members which extend upward from the front and rear edges of said horizontal member, and (ii) an upper side member which extends upward from the outer edge of said horizontal member between said front and rear end members, said upper side member and said front and rear end members being bonded to the inner surfaces of said main sidewall and said side member front and rear end flanges, respectively.

4. The cab extender as set forth in claim 3 wherein said mounting means include vertical fasteners which extend through said horizontal members and the top edges of said cargo walls in a manner that said fasteners are hidden from view behind said side members.

5. The cab extender as set forth in claim 3 wherein each of said mounting brackets includes a flange which extends downward from said horizontal member in a manner parallel to said cargo walls and which engages an inner surface of said cargo wall to prevent transverse movement of said cab extender relative to said truck.

6. The cab extender as set forth in claim 3 wherein said mounting bracket front and rear end members each have a transverse dimension which is less than or equal to the transverse dimension of said side member front and rear end flanges.

7. The cab extender as set forth in claim 2 additionally comprising a status light assembly which is mounted to said rear end portion of said top cover, and which includes a first brake light, a second light for indicating when the truck is backing, and a third light for illuminating the cargo bed.

8. The cab extender as set forth in claim 2 wherein said top cover rear end portion and said side member rear end flanges include lights for indicating the presence of said truck.

* * * * *